J. McL. POWER.
Lubricators.

No. 143,639.                                    Patented Oct. 14, 1873.

Witnesses:                                      Inventor:

UNITED STATES PATENT OFFICE.

JOHN McLURE POWER, OF PORT DISCOVERY, WASHINGTON TERRITORY.

IMPROVEMENT IN LUBRICATORS.

Specification forming part of Letters Patent No. 143,639, dated October 14, 1873; application filed June 7, 1873.

*To all whom it may concern:*

Be it known that I, JOHN McL. POWER, of Port Discovery, in the county of Jefferson and Territory of Washington, have invented a new and Improved Lubricator, of which the following is a specification:

The invention consists in the improvement of engine-lubricators, as hereinafter described and pointed out in the claims.

Figure 1:
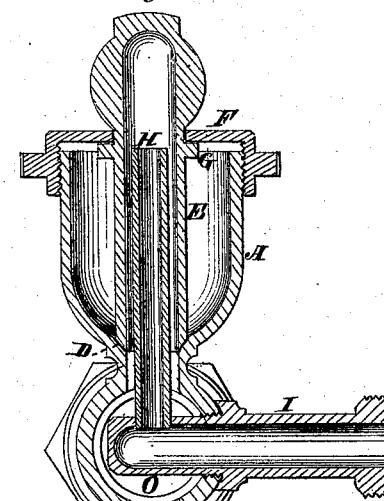
Figure 2:
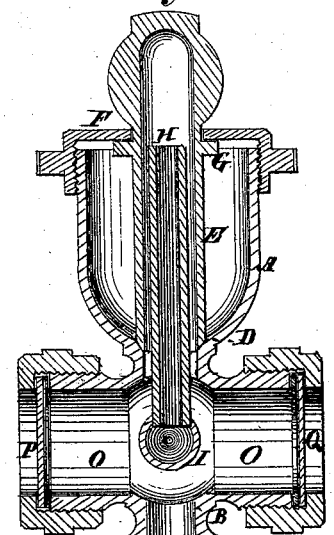
Figure 3:
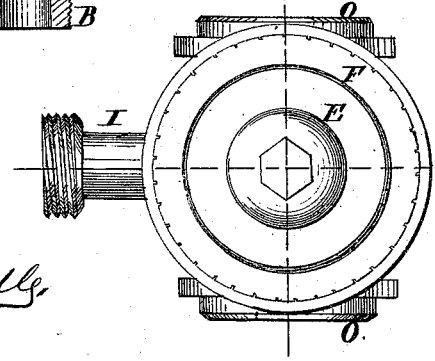

Figures 1 and 2 are sectional elevations of my improved lubricator; Fig. 1 being taken on the line $x\ x$ of Fig. 3, and Fig. 2 on the line $y\ y$; and Fig. 3 is a plan view.

Similar letters of reference indicate corresponding parts.

A is the oil-holder. B is the pipe connecting the holder with the steam pipe, chest, or other object to be lubricated. D is the valve, at the bottom of the holder, by which the escape of oil is regulated. This valve is formed on the end of a tube, E, which passes up through the cap F, and is closed at the top, and provided with a collar, G, by which the cap holds it down on its seat with a pressure regulated by screwing the cap up or down. H is a vertical pipe, rising up from pipe B below the valve about as high as the top of the oil-chamber, and connecting at the lower end with the steam-pipe I, by which the steam is admitted to carry the oil down through valve D and pipe B. This hollow valve-tube E is thus constituted a condenser, for condensing the steam. J is the glass tube which I propose to introduce into the space between sections of pipe B, both for use in lubricators and water-gages, and I secure it in the thimbles K, screwed into the enlarged and socketed ends L of the sections of the pipe, which are connected together by the rods M and nuts N, so that the tube is held rightly in the required position, and so that it may be packed, if need be, at the ends, with washers; also, so that for taking it out or putting it in, all that is needed is to unscrew nuts N about as much as one thimble screws into an end, L, and screw out one of the thimbles, when the tube will go in or come out readily. Above the tube J I have arranged the short tube O, traversing it at right angles, and placed an eyeglass, P, in one end, and a light-glass, Q, in the other, for the inspection of the vapors within.

The glasses are intended to show the condition of the condensed steam which forces the oil from the reservoir through pipe B, and to regulate its condition so as to prevent it from acting as a conductor of heat between the boiler and the oil in the reservoir.

Having thus described my invention, I claim as new and desire to secure by Letters Patent—

1. A transparent tube, J, connected with pipe-section B by end thimbles, in the manner and for the purpose described.

2. The combination, with a steam-forcing oiler, A E H, and a pipe, B, leading to the part to be oiled, of an intermediate cross-pipe, O, having a glass, P, at each end, as and for the purpose set forth.

JOHN McLURE POWER.

Witnesses:
  OTIS E. HOOKER,
  ALBERT H. TILDEN.